Oct. 27, 1953     J. H. GRAYSON     2,656,983
THERMOSTATIC VALVE STRUCTURE
Filed July 14, 1951
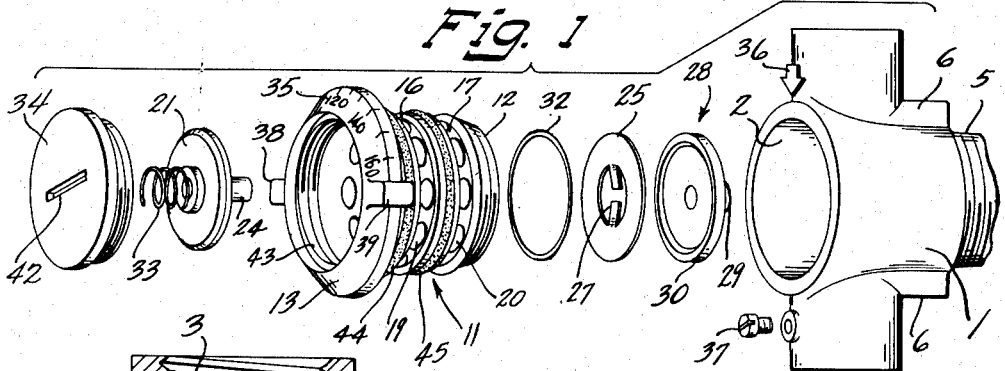
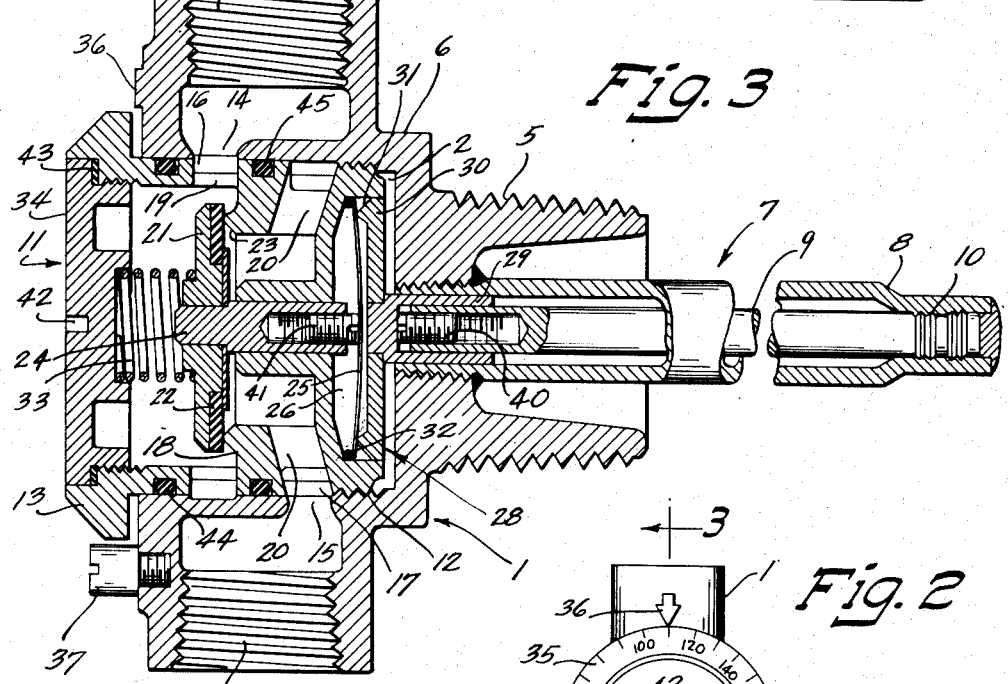
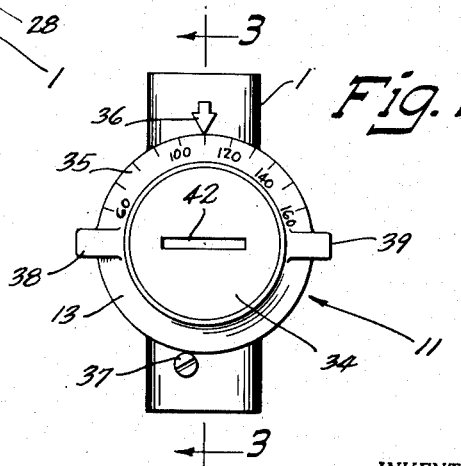
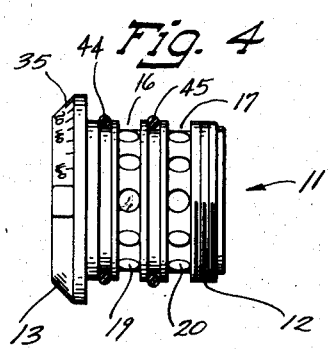
INVENTOR.
John H. Grayson
BY
Andrus & Sceales
Attorneys Patented Oct. 27, 1953

2,656,983

UNITED STATES PATENT OFFICE 2,656,983

THERMOSTATIC VALVE STRUCTURE

John Harry Grayson, Monrovia, Calif., assignor to Grayson-Greenamyer, Inc., Monrovia, Calif., a corporation of California Application July 14, 1951, Serial No. 236,724

2 Claims. (Cl. 236—48)

This invention relates to thermostatic control structures, and more particularly to a coaxially arranged snap-action thermostatic valve adapted to maintain the temperature of the water in a storage type water heater or the like between predetermined limits.

An object of the invention is to provide a coaxial thermostatic valve wherein the temperature selector scale is disposed at the front of the structure to facilitate reading of temperature indications and adjustment of the control for the desired temperature.

Another object of the invention is to provide a coaxial type snap-action thermostatic valve wherein all of the snap-action and valve elements may be easily removed as a unit and replaced without altering the temperature settings of the structure.

A further object is to provide a coaxial thermostatic valve having but a small number of parts to minimize the possibility of functional default.

Another object is to provide a thermostatic valve wherein the protrusion of the valve from the water tank is relatively small, thereby permitting the valve to be arranged between the water tank and a door in the outer casing of the water heater for concealment of the valve and related parts.

The thermostatic valve structure, in general, comprises an outer casing having inlet and outlet gas carrying passages therein and a thermal-responsive expansible and contractible means associated therewith. In order to cause the flow of gas between said inlet and outlet passages to be controlled by the thermal-responsive means in accordance with the temperature in a water heater tank, an inner casing containing all of the valve and snap-action elements of the structure is movably mounted within the outer casing and operatively adjacent the thermal-responsive means. Sealing means are provided between the outer casing and the exterior surface of the inner casing both to permit the position of the inner casing and contained elements to be altered relative to the thermal-responsive means for adjustment of the opening and closing temperatures of the valve elements and to permit the inner casing to be removed and replaced without readjustment of the temperature settings of the device.

Other objects and advantages of the invention will be set forth more fully in the following description of an embodiment of the invention illustrated in the accompanying drawings.

In the drawings:

Figure 1 is an exploded perspective view illustrating the relationship between the component parts of the structure;

Fig. 2 is a front elevation of the control;

Fig. 3 is an enlarged cross-sectional view taken along line 3—3 of Fig. 2; and

Fig. 4 is a side elevation of the inner casing member, showing the relative positions of the O-rings and the port portions of the inner casing.

Referring to the drawings, there is shown an outer casing 1 having a generally cylindrical main chamber 2 therein and inlet and outlet gas carrying passages 3 and 4, respectively, communicating with the chamber 2. The inlet gas passage 3 is illustrated as extending upwardly from the chamber for communication with an inlet gas pipe. The outlet gas passage 4 extends downwardly from the chamber and communicates with a pipe leading to the main burner of a storage type water heater or the like.

In order to provide for the mounting of the structure on the tank portion of the water heater, an externally threaded projection 5 is arranged coaxially of the main chamber 2 and a pair of narrow wrench flats 6 are provided adjacent the inner end of the projection. The structure may thus be easily threaded into an aperture in the water tank with a minimum of protrusion of the casing from the tank.

The projection 5 is also internally threaded to receive the inner end of a thermal-responsive expansible and contractible means 7 arranged coaxially of the chamber 2. The thermal-responsive means preferably comprises a tube 8 threaded into the projection 5 and suitably sealed to prevent leakage of water into the chamber 2, and a rod 9 mounted axially of the tube and connected as at 10 to the outer end thereof.

In order to make the rod 9 move toward the chamber 2 when the water surrounding tube 8 becomes relatively cold, the tube and rod are formed of metals having, respectively, high and low coefficients of expansion. For example, the rod may be made of Invar and the tube of copper.

As will be fully described subsequently, the movements of the rod 9 toward and away from chamber 2 are adapted to actuate the various valve elements of the structure at temperatures depending upon the relative positions of the valve elements and the rod. To permit variation of these relative positions for adjustment to different water temperatures, it has been customary to provide a yoke disposed at the rear of the casing and adapted to alter the projection of the rod. This, however, necessitated a relatively large protrusion of the structure from the water tank, making it difficult or impossible to conceal the control in the insulation space between the outer casing of the water heater and the tank.

According to the invention, the relative positions of the valve elements and rod 9 are altered through axial movement of a generally cylindrical inner casing 11 mounted within the main chamber 2 and containing all of the valve and snap-action elements of the control. The inner casing 11 is provided on its inner end with a threaded portion 12, adapted to be received within a correspondingly threaded portion of the outer casing, and on its outer end with a beveled flange 13 to facilitate turning of the inner casing for adjustment to various temperature settings.

Referring particularly to Fig. 3, the outer casing inlet and outlet ports 14 and 15 through which the respective gas passages 3 and 4 communicate with the main chamber 2 are offset from each other axially of the chamber. Correspondingly, the inner casing 11 is constructed with two spaced circumferentially grooved portions 16 and 17 arranged on opposite sides of a valve seat portion 18 and registering, respectively, with the ports 14 and 15. In addition, the grooved portions 16 and 17 are provided with sets 19 and 20 of circumferentially spaced inlet and outlet ports, so that the path of the gas flow is from inlet passage 3 through port 14 in the outer casing, grooved portion 16 in the inner casing, ports 19, the valve seat portion 18, ports 20, grooved portion 17, and port 15 to outlet passage 4.

Because of the use of the grooved portions 16 and 17 in the inner casing, the volume of gas flow through the various ports is maintained at a substantially constant high level regardless of the radial position to which the inner casing is turned.

The flow of gas between the inlet and outlet gas passages 3 and 4 is controlled by a valve disc 21 having a gasket 22 thereon for seating on a circumferential ridge 23 provided on the valve seat portion. The disc 21 is assembled on a stem 24 which is coaxial with rod 9 and is freely slidable in a guide opening at the inner end of the casing 11.

In order to make the valve disc 21 leave its seat 18 in a snap-action manner and in accordance with the amplified movements of the rod 9, a concave-convex snap disc 25 is loosely fitted into a recess 26 in the inner end of casing 11 and between the valve stem 24 and the rod. The snap disc is formed of a suitable spring material and is provided with inwardly extending lever arm portions 27, the characteristics of the disc being such that the arms 27 remain on the right side of dead center (Figs. 1 and 3) at all times except when the disc is being pressed to the left by a plunger 28 mounted on the end of rod 9.

The plunger 28 is constructed with a sleeve portion 29 adapted to fit over the end of rod 9 between the rod and tube 8, and with a relatively large disc portion 30 having a raised ridge 31 thereon for engagement with snap disc 25 a short distance inwardly of the rim thereof. Upon movement of the rod 9 and plunger 28 inwardly due to cooling of the water within the tank, the ridge 31 cooperates with a fulcrum ring 32 disposed between the outer edge portion of the snap disc and inner casing 11 to suddenly snap the arm portions 27 to the left of dead center and effect opening of the valve.

Due to the location of the ridge 31 a short distance inwardly of fulcrum ring 32 and the rim of the snap disc, the described lever operation results in a relatively large amplification of the motion of rod 9. Such amplification is desirable in that the end of the rod only moves two one-thousandths of an inch during operation of the control structure.

Once the valve disc 21 has left its seat, it remains in opened position until the heating of the water within the tank causes the rod 9 and plunger 28 to decrease the pressure on the snap disc 25. The disc 25 then snaps to the right of dead center because of its inherent properties, permitting the valve disc to be returned to its seat by a compression spring 33.

The compression spring 33 is mounted between the valve disc and a gas-tight closure cap 34 which is provided over the outer end of inner casing 11 inwardly of the beveled flange 13. The spring 33 is made sufficiently weak to have little or no effect on the water temperatures at which the valve opens and closes, said temperatures being instead determined by the relative axial positions of the inner casing 11 and rod 9 as previously mentioned. The axial position of the inner casing 11 relative to the rod, which depends because of the threaded connection between the inner and outer casings upon the position to which the inner casing is rotated, is related to the resulting water temperatures within the storage tank by means of a temperature selector scale 35 provided on the beveled flange 13 and a corresponding pointer 36 cast integral with the outer casing.

To initially cause the temperature scale to conform to the water temperatures, a course adjustment may be made by regulating the distance that the inner casing 11 extends into the main chamber 2 in the outer casing. For example, when the inner casing is threaded into the chamber for three complete turns, it may be known that the water temperatures correspond approximately to those indicated by the scale and pointer. In making such complete turns, it is necessary to remove a stop screw 37 provided on the outer casing for engagement with a pair of diametrically opposed stop projections 38 and 39 formed integral with the beveled flange 13.

For fine adjustment of the control to make the scale 35 and pointer 36 read the exact water temperatures, an adjusting screw 40 is threaded into the inner end of rod 9 to form an extension thereof. The effective position of the rod may thus be varied, which operates through the plunger 28 and snap disc 25 to vary the opening and closing temperatures of the valve.

Similarly to the case of screw 40, an adjusting screw 41 is threaded into the inner end of the valve stem 24. The screw 41 is adjusted to make the valve open simultaneously with the snapping of snap disc 25, thereby preventing the valve from opening slowly while insuring a maximum throw of the valve disc 21 from the valve seat portion 18.

When it is desired to clean or inspect the valve, it is merely necessary to remove the closure cap 34, a screwdriver slot 42 and threaded connection being provided for this purpose. After servicing, the closure cap is threaded into the end of the inner casing 11 against a gasketed gas-tight shoulder 43. Since the closure cap must press tightly against the shoulder 43, and since the characteristics of such shoulders necessarily vary with time and pressure, the amount of insertion of the closure cap into the inner casing upon replacement will not be the same as originally. The resulting variation in the compression of spring 33, however, will not alter the temperature settings of the structure due to the fact that the spring is relatively weak and inoperative in varying the opening and closing temperatures of the valve.

To inspect the snap-action elements of the device and to adjust the screws 40 and 41, the stop screw 37 is unscrewed to permit rotation and removal of the inner casing 11 as a unit together with the parts contained therein. In creating a gas-tight fit upon replacement of the inner casing, it would not be feasible to employ a gas-tight shoulder such as shoulder 43, since the resulting variation in the amount of insertion of the inner casing would destroy the temperature settings of the structure and necessitate readjustment thereof. The destructive effect of a gas-tight shoulder is very substantial in this regard because the rod 9 only moves two one-thousandths of an inch during operation of the control. Also, a gas-tight shoulder could not be employed since the adjustment of the control for the desired water temperature requires that the inner casing be rotated and thus axially shifted.

According to the invention, circumferential sealing means 44 and 45 are suitably mounted at the periphery of the inner casing 11 to engage both the inner and outer casings. The seals preferably comprise O-rings formed, for example, of synthetic rubber and capable of withstanding pressures many times the pressure of the gas within the control.

One seal 45 is disposed between the grooved portions 16 and 17 of the inner casing and serves to prevent gas leakage from the inlet gas passage 3 to the outlet gas passage 4. The other seal 44 is axially spaced forwardly of the grooved portion 16 for prevention of gas leakage into the atmosphere.

Because of their nature and disposition, the O-rings are, within limits, unaffected by the axial position of the inner casing. Accordingly, no leakage occurs when the inner casing is axially shifted for temperature setting purposes, and the temperature settings of the control are maintained when the inner casing is removed for inspection and subsequently replaced.

The described thermostatic control structure may be manufactured with a minimum of expense because of its simple structure and small number of parts. The outer casing, for example, may be easily made of cast brass and the inner casing may be an aluminum alloy die casting.

Under the invention, the protrusion of the control from the water heater tank is relatively small, and the temperature scale is plainly visible at the front of the control. The structure may therefore be concealed behind a door in the outer casing of a hot water storage tank, with no spacing being necessary between the casing and tank other than is normally provided by the insulation of the tank.

Various embodiments of the invention may be employed within the scope of the following claims.

I claim:

1. A coaxially arranged snap-action thermostatic valve structure comprising an outer casing having a cylindrical recess opening at one end thereof, thermostatic means subject to movement in response to changes of temperature and having a threaded adjustment member carried within said recess at the inner end thereof for movement and adjustment coaxially therewith, a cylindrical valve body threaded within said recess and having a valve seat and a movable valve member with a spring normally biasing said valve member against said seat toward the inner end of said recess, a circular snap-action device carried by the inner end of said valve body, an abutment plate between said threaded adjustment member and said snap-action device and disposed to operate the latter, a plunger carried by said valve body and axially movable therein by said snap-action device and engageable with said valve to lift the same from said seat and against the biasing action of said spring, and index means carried by said casing and valve body establishing preterminded positions of rotation of the latter within said casing whereby the rotation of said valve body moves the same axially for the selective adjustment of the temperature to be maintained by said thermostatic means as controlled by said valve member, said threaded adjustment member providing for the correlation of said snap-action device and the opening of said valve according to the rotational position of said cylindrical valve body.

2. A coaxially arranged snap-action thermostatic valve structure comprising an outer casing having a cylindrical recess opening at one end thereof and having a threaded projection at the other end thereof for mounting in a storage-type water heater, a tube adapted to be disposed within said water heater and having an open end secured in said threaded projection and opening centrally into said recess, a rod within said tube and having a lesser coefficient of expansion than that of said tube, the end of said rod at the free end of said tube being secured therein and the opposite end of said rod at the open end of said tube being subject to movement axially in response to the temperature of the water within the tank by reason of the expansion and contraction differential of the tube and rod, a threaded adjustment member carried by said movable end of the rod to extend therefrom into said recess and adapted to vary the length of the rod, a cylindrical valve body threaded within said recess and having separate passages axially spaced respecting the valve body and opening radially thereof and communicating through a valve opening therein, said valve body being provided with a valve seat defining said opening and having a movable valve member and a spring normally biasing said valve member against said seat toward the inner end of said recess to close the communication of said passages, said casing having inlet and outlet passages for connection to a source of gas supply and a burner, respectively, and opening into said recess to communicate with the respective passages of said cylindrical valve body, sealing means between said casing and said valve body within the recess and disposed to prevent leakage of gas externally of said valve body both between the passages and from said recess, while allowing rotation of the valve body within said casing to provide axial adjustment of said body with respect to said threaded adjustment member carried by said rod, a circular snap-action device carried by the inner end of said valve body, an abutment plate between said threaded adjustment member and said snap-action device and disposed to operate the latter, a plunger carried by said valve body and axially movable therein by said snap-action device to engage said valve and lift the same from said seat and against the biasing action of said spring, and index means carried by said casing and valve body establishing predetermined positions of rotation of the latter within said casing whereby the rotation of said valve body allows the adjustment of the temperature of the water maintained by the burner as controlled by said valve member, said threaded adjustment member on said rod providing for the operation of said snap-action device and the opening of said valve at the temperature of water indicated by said index and the rotational position of said cylindrical valve body, and said valve body being removable for servicing of said valve and valve spring and said snap-action device and replacement thereof without altering the temperature correlation provided for by said adjustment member.

JOHN HARRY GRAYSON.

References Cited in the file of this patent

UNITED STATES PATENTS

| Number | Name | Date |
| --- | --- | --- |
| 1,919,265 | Vaughn | July 25, 1933 |
| 1,994,470 | Grayson | Mar. 19, 1935 |

FOREIGN PATENTS

| Number | Country | Date |
| --- | --- | --- |
| 113,007 | Australia | Apr. 28, 1941 |